(12) United States Patent
Jessop

(10) Patent No.: US 11,988,389 B2
(45) Date of Patent: May 21, 2024

(54) OVEN HANDLE FASTENER

(71) Applicant: Shauna Jessop, Boise, ID (US)

(72) Inventor: Shauna Jessop, Boise, ID (US)

(*) Notice: Subject to any disclaimer, the term of this patent is extended or adjusted under 35 U.S.C. 154(b) by 0 days.

(21) Appl. No.: 17/034,485

(22) Filed: Sep. 28, 2020

(65) Prior Publication Data

US 2022/0099304 A1    Mar. 31, 2022

(51) Int. Cl.
| | |
|---|---|
| *A47B 96/06* | (2006.01) |
| *F16B 2/22* | (2006.01) |
| *F16M 13/02* | (2006.01) |
| *F24C 15/00* | (2006.01) |

(52) U.S. Cl.
CPC ............... *F24C 15/00* (2013.01); *F16B 2/22* (2013.01); *F16M 13/02* (2013.01)

(58) Field of Classification Search
CPC ............ F24C 15/00; F16B 2/22; F16M 13/02
USPC .......... 248/214, 215, 220.21, 229.1, 229.15, 248/229.16, 226.11, 229.25, 229.26, 248/230.1, 230.6, 230.7, 231.71, 231.81, 248/316.1, 316.7; 24/455
See application file for complete search history.

(56) References Cited

U.S. PATENT DOCUMENTS

| | | | | |
|---|---|---|---|---|
| 7,322,551 | B2* | 1/2008 | Simonsen | A47K 10/12 |
| | | | | 248/315 |
| 9,080,715 | B2* | 7/2015 | Biddle | A47G 29/083 |
| 9,706,898 | B1* | 7/2017 | Kraft | A47L 19/00 |
| 10,022,006 | B1* | 7/2018 | Williams | F16M 13/022 |
| 2009/0236299 | A1* | 9/2009 | Hall | A47K 10/02 |
| | | | | 211/16 |
| 2012/0298824 | A1* | 11/2012 | West | F16B 2/205 |
| | | | | 248/316.7 |
| 2014/0061396 | A1* | 3/2014 | Magno, Jr. | H02G 3/32 |
| | | | | 248/72 |
| 2016/0081519 | A1* | 3/2016 | Manko | A47K 10/12 |
| | | | | 211/16 |
| 2017/0156553 | A1* | 6/2017 | Manko | A47K 10/04 |

* cited by examiner

*Primary Examiner* — Todd M Epps
(74) *Attorney, Agent, or Firm* — The Iwashko Law Firm, PLLC; Lev Ivan Gabriel Iwashko

(57) ABSTRACT

An oven handle fastener, including a fastener body comprising a heat resistant material, and a spring clip, including an arcuate portion disposed at a first end to at least a portion of the fastener body to connect at least one item to an oven handle, such that the arcuate portion is spring biased to prevent the at least one item from falling off the oven handle, and a planar portion disposed on at least a portion of a second end of the arcuate portion to facilitate gripping thereof.

5 Claims, 3 Drawing Sheets

OVEN HANDLE FASTENER

BACKGROUND

1. Field

The present general inventive concept relates generally to a fastener, and particularly, to an oven handle fastener.

2. Description of the Related Art

In domestic settings, it is quite common for people to place towels on a handle of an oven as it serves a purpose of décor and the practical use of having an accessory to help with managing hot dishes and/or pans, etc. Yet, it is just as common for these towels to frequently fall off the handle of the oven and/or any other appliance handle.

A fallen towel is an inconvenience because an owner has to constantly pick it up, reposition the towel, and/or straighten it for a tidy aesthetic. Also, the fallen towel can be a problem for people with health problems, such as an injured back and/or an injured leg that causes poor balance.

Therefore, there is a need for other an oven handle fastener that can secure a towel and/or other accessory to the handle of the oven.

SUMMARY

The present general inventive concept provides an oven handle fastener.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing an oven handle fastener, including a fastener body comprising a heat resistant material, and a spring clip, including an arcuate portion disposed at a first end to at least a portion of the fastener body to connect at least one item to an oven handle, such that the arcuate portion is spring biased to prevent the at least one item from falling off the oven handle, and a planar portion disposed on at least a portion of a second end of the arcuate portion to facilitate gripping thereof.

The arcuate portion may be semicircular.

The second end of the arcuate portion may be distanced away from the fastener body to facilitate the connection to the oven handle.

The oven handle fastener may further include a movement resistant surface disposed on at least a portion of a rear surface of the spring clip to prevent movement of the spring clip while connected to the oven handle.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Figure 1A:
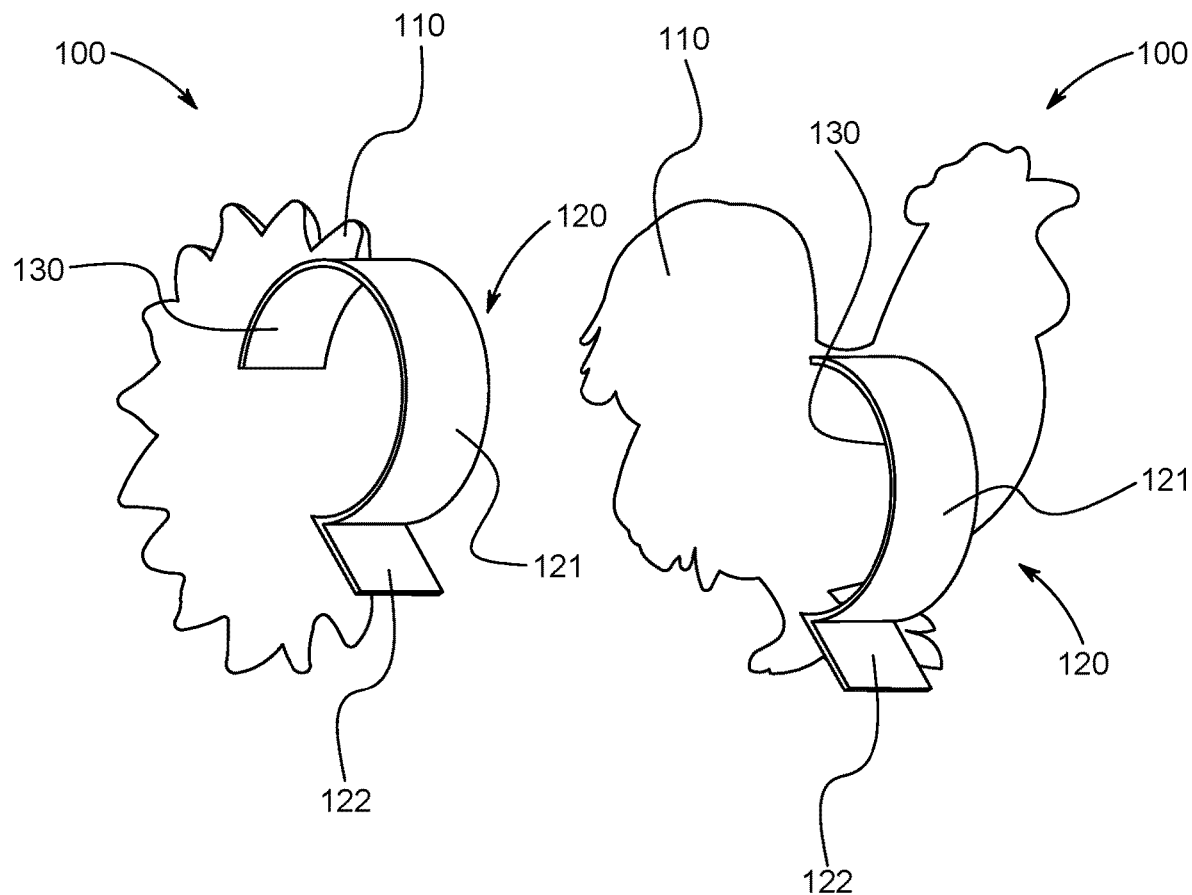
FIG. 1A illustrates a rear perspective view of an oven handle fastener, according to an exemplary embodiment of the present general inventive concept.

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

LIST OF COMPONENTS

Oven Handle Fastener 100
Fastener Body 110
Spring Clip 120
Arcuate Portion 121
Planar Portion 122

Movement Resistant Surface 130
Oven Handle Fastener 200
Fastener Body 210
Spring Clip 220
Arcuate Portion 221
Planar Portion 222
Movement Resistant Surface 230

FIG. 1A illustrates a rear perspective view of an oven handle fastener 100, according to an exemplary embodiment of the present general inventive concept.

Figure 1B:
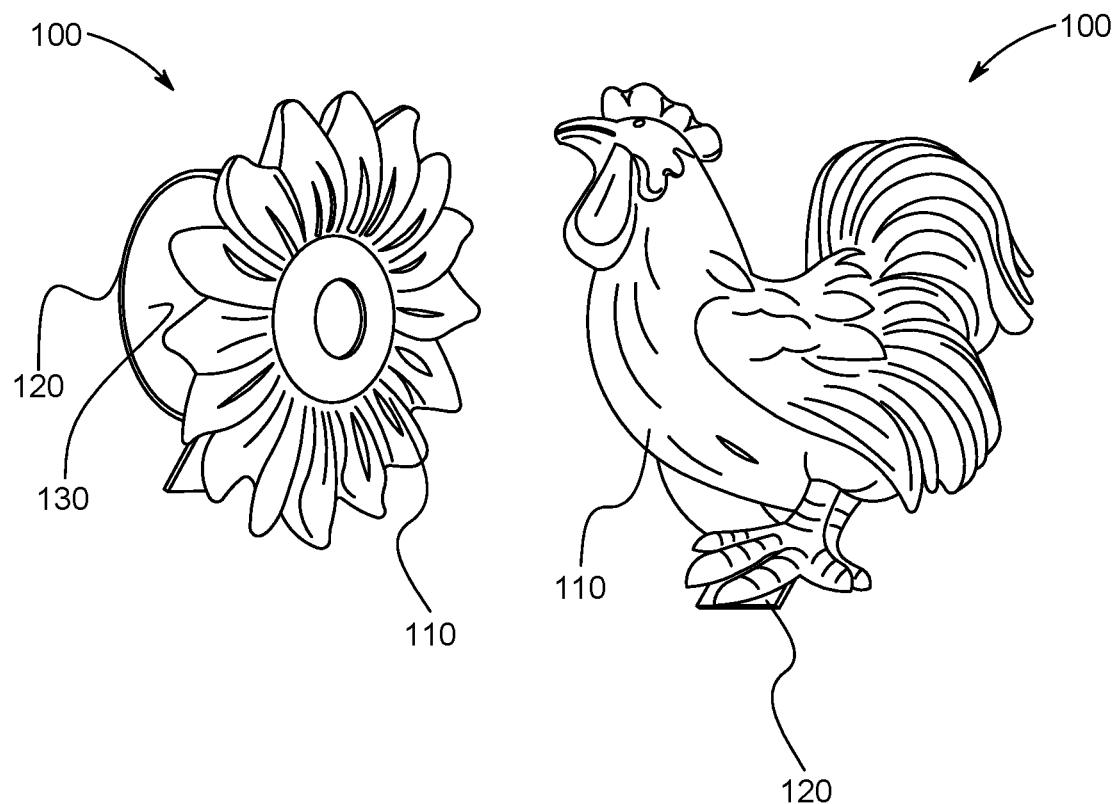
FIG. 1B illustrates a front perspective view of the oven handle fastener, according to an exemplary embodiment of the present general inventive concept.

FIG. 1B illustrates a front perspective view of the oven handle fastener 100, according to an exemplary embodiment of the present general inventive concept.

The oven handle fastener 100 may be constructed from at least one of metal, plastic, wood, ceramic and rubber, etc., but is not limited thereto.

The oven handle fastener 100 may include a fastener body 110, a spring clip 120, and a movement resistant surface 130, but is not limited thereto.

Referring to FIGS. 1A and 1B, the fastener body 110 is illustrated to have at least one first shape (i.e. a flower) and/or at least one second shape (i.e. a chicken, a rooster). However, the fastener body 110 may any type of shape and/or color based on a preference of a user. Moreover, a difference in the shape of the fastener body 110 may facilitate distinguishing a use of the oven handle fastener 100 by a colorblind user.

Furthermore, the fastener body 110 may be constructed of a heat resistant material. For example, the fastener body 110 may be constructed of a heat resistant plastic. Also, an outer surface of the fastener body 110 may be constructed with a non-heat conducting material, such that the fastener body 110 may not increase in temperature in response to receiving heat from an external heat source thereto.

The spring clip 120 may include an arcuate portion 121 and a planar portion 122, but is not limited thereto.

The spring clip 120 may be constructed of steel and plastic, but is not limited thereto. Also, the spring clip 120 may be constructed with a non-heat conducting material, such that the spring clip 120 may not increase in temperature in response to receiving heat from the external heat source thereto.

The arcuate portion 121 may be disposed at a first end on at least a portion of the fastener body 110, such that the arcuate portion 121 is a convex curve and/or semicircular to fit around a round oven handle. However, the arcuate portion 121 may be used on any type of oven handle. Moreover, a second end of the arcuate portion 121 may be distanced away from the fastener body 110 to facilitate connecting the spring clip 120 on the round oven handle.

The arcuate portion 121 may be spring biased to move the second end toward the fastener body 110, such that at least one item (e.g., a towel and/or an accessory) disposed on the round oven handle may be clipped under the arcuate portion 121. In other words, the arcuate portion 121 may prevent the at least one item from falling off the round oven handle while the arcuate portion 121 is connected to the round oven handle with the at least one item under the arcuate portion 121.

The planar portion 122 may be disposed at the second end of the arcuate portion 121. Additionally, referring to FIG. 1A, the planar portion 122 may extend a predetermined distance away from the fastener body 110 and/or the arcuate portion 121. Moreover, the planar portion 122 may be angularly disposed with respect to the fastener body 110 and/or the arcuate portion 121. The planar portion 122 may facilitate gripping thereof.

The movement resistant surface 130 may include a magnet and a textured surface, but is not limited thereto.

The movement resistant surface 130 may be disposed on at least a portion of a rear surface of the arcuate portion 121.

The movement resistant surface 130 may have a plurality of bubbled protrusions extending away therefrom. Also, the movement resistant surface 130 may be a coated abrasive to prevent movement of the spring clip 120 while connected to the round oven handle. Alternatively, the movement resistant surface 130 may be a magnet and/or a smooth surface constructed of rubber.

Therefore, the oven handle fastener 100 may prevent the at least one item from falling off the round oven handle. As such, the oven handle fastener 100 may help organize a kitchen of the user.

Figure 2:
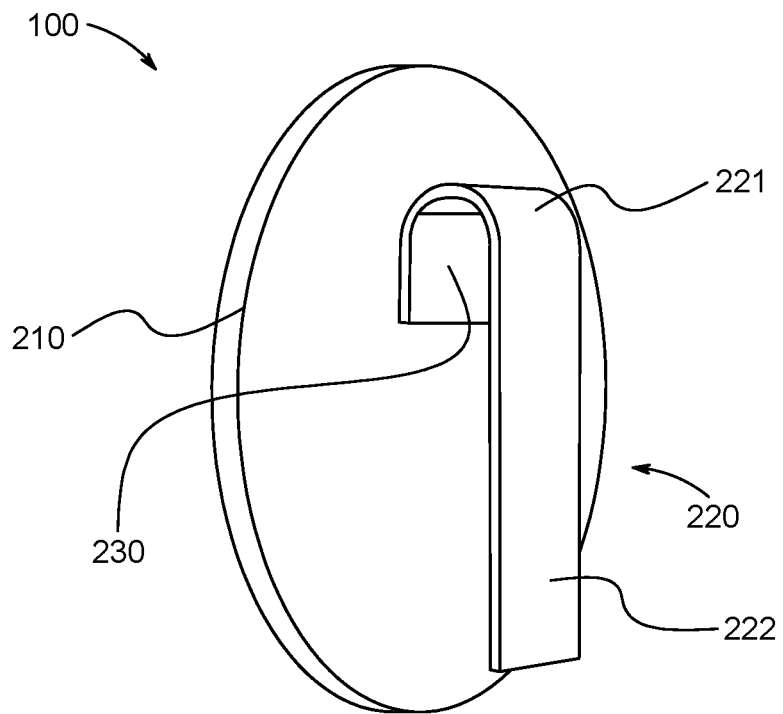
FIG. 2 illustrates a rear perspective view of an oven handle fastener, according to another exemplary embodiment of the present general inventive concept.

FIG. 2 illustrates a rear perspective view of an oven handle fastener 200, according to another exemplary embodiment of the present general inventive concept.

The oven handle fastener 200 may be constructed from at least one of metal, plastic, wood, ceramic and rubber, etc., but is not limited thereto.

The oven handle fastener 200 may include a fastener body 210, a spring clip 220, and a movement resistant surface 230, but is not limited thereto.

Referring to FIG. 2, the fastener body 210 is illustrated to have at least one shape (i.e. circular). However, the fastener body 210 may any type of shape and/or color based on the preference of the user. Moreover, a difference in the shape of the fastener body 210 may facilitate distinguishing a use of the oven handle fastener 200 by a colorblind user.

Furthermore, the fastener body 210 may be constructed of a heat resistant material. For example, the fastener body 210 may be constructed of a heat resistant plastic. Also, an outer surface of the fastener body 210 may be constructed with a non-heat conducting material, such that the fastener body 210 may not increase in temperature in response to receiving heat from an external heat source thereto.

The spring clip 220 may include an arcuate portion 221 and a planar portion 222, but is not limited thereto.

The spring clip 220 may be constructed of steel and plastic, but is not limited thereto. Also, the spring clip 220 may be constructed with a non-heat conducting material, such that the spring clip 220 may not increase in temperature in response to receiving heat from the external heat source thereto.

The arcuate portion 221 may be disposed at a first end on at least a portion of the fastener body 210, such that the arcuate portion 221 is a convex curve to fit around a standard (i.e. rectangular) oven handle. However, the arcuate portion 221 may be used on any type of oven handle. Moreover, a second end of the arcuate portion 221 may be distanced away from the fastener body 210 to facilitate connecting the spring clip 220 on the standard oven handle.

The arcuate portion 221 may be spring biased to move the second end toward the fastener body 210, such that at least one item (e.g., a towel and/or an accessory) disposed on the standard oven handle may be clipped under the arcuate portion 221. In other words, the arcuate portion 221 may prevent the at least one item from falling off the standard oven handle while the arcuate portion 221 is connected to the standard oven handle with the at least one item under the arcuate portion 221.

The planar portion 222 may be disposed at the second end of the arcuate portion 221. Additionally, referring to FIG. 2, the planar portion 222 may be distanced a predetermined distance away from the fastener body 210 and/or the arcuate portion 221. The planar portion 222 may facilitate gripping thereof.

The movement resistant surface 230 may include a magnet and a textured surface, but is not limited thereto.

The movement resistant surface 230 may be disposed on at least a portion of a rear surface of the arcuate portion 221 and/or a rear surface of the planar portion 222.

The movement resistant surface 230 may have a plurality of bubbled protrusions extending away therefrom. Also, the movement resistant surface 230 may be a coated abrasive to prevent movement of the spring clip 220 while connected to the round oven handle. Alternatively, the movement resistant surface 230 may be a magnet and/or a smooth surface constructed of rubber.

Therefore, the oven handle fastener 200 may prevent the at least one item from falling off the standard oven handle. As such, the oven handle fastener 200 may help organize a kitchen of the user.

The present general inventive concept may include an oven handle fastener 100, including a fastener body 110 comprising a heat resistant material, and a spring clip 120, including an arcuate portion 121 disposed at a first end to at least a portion of the fastener body 110 to connect at least one item to an oven handle, such that the arcuate portion 121 is spring biased to prevent the at least one item from falling off the oven handle, and a planar portion 122 disposed on at least a portion of a second end of the arcuate portion 121 to facilitate gripping thereof.

The arcuate portion 121 may be semicircular.

The second end of the arcuate portion 121 may be distanced away from the fastener body 110 to facilitate the connection to the oven handle.

The oven handle fastener 100 may further include a movement resistant surface 130 disposed on at least a portion of a rear surface of the spring clip 120 to prevent movement of the spring clip 120 while connected to the oven handle.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. An oven handle fastener, comprising:
   a fastener body comprising a heat resistant material; and
   a spring clip, comprising:
      an arcuate portion disposed at a first end on at least a portion of the fastener body to connect at least one item to an oven handle, such that the arcuate portion is spring biased to prevent the at least one item from falling off the oven handle, such that the arcuate portion is disposed away from the fastener body at the first end in a single direction and forms a semi-circular shape, and
      a planar portion disposed on at least a portion of a second end of the arcuate portion to facilitate gripping thereof and planarly extend away from the second end of the arcuate portion with respect to a direction.

2. The oven handle fastener of claim 1, wherein the arcuate portion is semicircular.

3. The oven handle fastener of claim 1, wherein the second end of the arcuate portion is distanced away from the fastener body to facilitate a connection to the oven handle.

4. The oven handle fastener of claim 1, further comprising:
   a movement resistant surface disposed on at least a portion of a rear surface of the spring clip to prevent movement of the spring clip while connected to the oven handle.

5. An oven handle fastener, comprising:
   a fastener body constructed of a heat resistant material and a non-heat conducting material on an outer surface thereof; and
   a spring clip constructed of a non-heat conducting material, the spring clip comprising:
      an arcuate portion disposed at a first end away from the fastener body to connect at least one item to an oven handle, such that a second end of the arcuate portion is spring biased toward the fastener body to prevent the at least one item from falling off the oven handle, and
      a planar portion disposed on at least a portion of a second end of the arcuate portion to facilitate gripping thereof and planarly extend away from the second end of the arcuate portion with respect to a direction.

* * * * *